Jan. 8, 1929.
R. C. GEER
1,698,193
ANTILOCKING SPINNER BLADE CLEVIS
Filed March 28, 1927
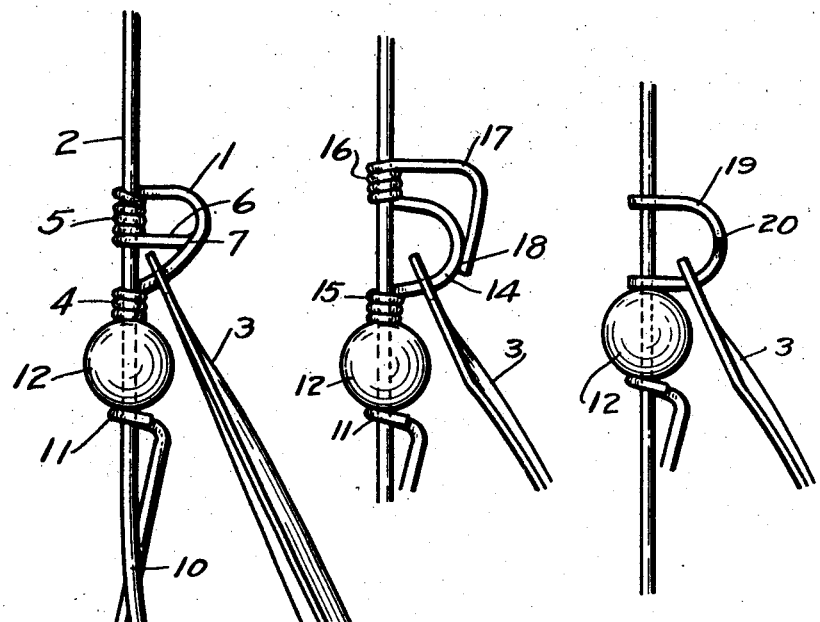
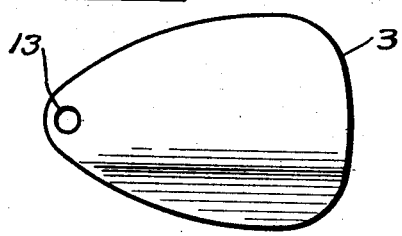
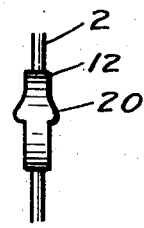
Inventor
Ralph C. Geer
By Harry Bowen
Attorney Patented Jan. 8, 1929.

1,698,193

UNITED STATES PATENT OFFICE.

RALPH C. GEER, OF TACOMA, WASHINGTON.

ANTILOCKING SPINNER-BLADE CLEVIS.

Application filed March 28, 1927. Serial No. 179,125.

The invention is a device for attaching spinner blades to a fishing line and holding them in the running position, which permits a free movement of the blade and at the same time prevents the blade locking in a backward position.

The object of the invention is to provide a clevis for attaching spinner blades to fishing lines, which has an extra member for preventing the blade taking the reverse position.

A further object of the invention is to provide a clevis that is free to spin on a staff, with means for preventing an object on one portion of the clevis moving to the other portion.

And a still further object of the invention is to provide a non-reversible spinner blade clevis which is of a simple and economical construction.

With these ends in view, the invention embodies a clevis formed of a U-shaped piece of material with bearings at the ends and means at the central part to prevent an object on one side passing to the other side.

Other features and advantages of the invention will appear from the following description taken in connection with the drawing, wherein:—

Figure 1 is a view showing the device as it would appear in use.

Figure 2 is a similar view showing a clevis of an alternate design.

Figure 3 is also a similar view showing a clevis of another alternate design.

Figure 4 is a side view of the clevis shown in Figure 3.

Figure 5 is a plan view of the spinner blade shown on the clevis in Figure 1.

Figure 6 is an end view of the spinner blade.

The drawings are made on a somewhat enlarged scale so that the details may be more readily understood.

In the drawings, the device is shown as it would be made wherein numeral 1 indicates the clevis, numeral 2 the wire upon which it is mounted, and numeral 3 the spinner blade.

The clevis 1 is shown in the preferred design in Figure 1, in which the U-shaped portion is curved with a small radius at the upper side, and the lower end is provided with a coil 4, as shown. The upper end is provided with a coil 5 and at the lower end of the coil is a member 6, which extends across the opening of the U and is attached to the U portion of the clevis at the point 7. It will be observed that the spinner blade 3 is held on the portion of the clevis between the point 7 and the coil 4.

The lower portion of the wire 2 is bent as shown with a complete loop 8 at the lower end at the upper side of which the wire is crossed and extended outward to points 9, which form shoulders that positively hold a hook or other device that may be placed in the loop 8 in the downward position. The end of the wire crosses the main portion again at the point 10 and is then fastened over it by a hook 11, as shown. A ball or bead 12 may be placed between the hook and the end of the clevis, as shown. This bead may be red or of any other suitable color.

The spinner blade 3 is made of a curved piece of plate which is formed as shown in Figure 5, and curved as shown in Figure 6. This plate is provided with an opening 13 that is of a sufficient size to permit it to pass over the coil 4 at the end of the clevis, as the blade is placed upon the clevis. The blade shown in Figure 5 is practically of normal size, whereas, the blade shown in Figure 1 as well as the rest of the figure is drawn to about twice normal size.

The clevis shown in Figure 2 is made with a U-shaped portion 14, having a coil 15 similar to the coil 4 at the lower end, another coil 16 at the upper end which extends upward from the end of the clevis, and a member 17 that extends outward from the upper end of the coil and downward until it engages the portion 14 at the point 18. In the design shown in Figure 3, the clevis is made with a flat piece of material 19 having shoulders 20 to prevent the blade 3 passing upward beyond the center. It will be observed that either of the devices shown will hold the blade 3 in substantially a downward position and thereby prevent its moving upward to such a position that it will be caught in what is known as the reverse position.

It will be understood that changes may be made in the construction without departing from the spirit of the invention. One of which changes may be in the design of the clevis, another may be in the use of other means on the clevis for preventing the blade taking the reverse position, and still another may be in the use of the clevis with any other fishing tackle.

The construction will be readily understood from the foregoing description. To use the device, the blade may be placed over the clevis as hereinbefore described, and the clevis may be placed on the wire 2 as shown in the drawing, and it will be observed that as the device is pulled through the water, the blade is free to spin, and all danger of its taking the reverse position is eliminated.

Having thus fully described the invention, what I claim as new and desire to secure by Letters Patent, is:—

1. In a clevis, a wire bent in the form of a U, coils at the ends of the said wire, and a member extending from the end of one of the coils to the central portion of the said U.

2. In a clevis of the class described a U shaped piece of material having means at the ends by which it may be rotatably mounted upon a bar and a member extending from a point in the U shaped portion to the bar to prevent an object mounted thereon moving from one section of the U shaped portion to the other.

3. In a clevis of the class described, a piece of material bent in the form of a U, means at the ends of the said piece of material by which it may be rotatably mounted upon a bar, and means at the central portion of the said clevis for preventing an object mounted thereon moving to the opposite side thereof.

In testimony whereof he affixes his signature.

RALPH C. GEER.